United States Patent [19]

Ingram

[11] 4,044,492

[45] Aug. 30, 1977

[54] FISHING LURE

[76] Inventor: Alexander John Ingram, 40 Kiln Close, Mevagissey, Cornwall, England

[21] Appl. No.: 659,884

[22] Filed: Feb. 20, 1976

[30] Foreign Application Priority Data

Feb. 28, 1975   United Kingdom ............... 8516/75

[51] Int. Cl.² ............................................. A01K 85/00
[52] U.S. Cl. ................................................ 43/42.28
[58] Field of Search ............... 43/42.09, 42.24, 42.28, 43/42.37, 42.38, 42.48, 42.45, 42.36, 42.05

[56] References Cited

U.S. PATENT DOCUMENTS

| 1,477,864 | 12/1923 | Bolton | 43/42.48 |
|---|---|---|---|
| 2,765,572 | 10/1956 | Woolfe | 43/42.28 |
| 3,218,750 | 11/1965 | Lewin | 43/42.36 |
| 3,445,953 | 5/1969 | Dailey | 43/42.28 |
| 3,483,651 | 12/1969 | Borger | 43/42.48 |
| 3,490,165 | 1/1970 | Thomassin | 43/42.09 |

Primary Examiner—Warner H. Camp
Attorney, Agent, or Firm—William Anthony Drucker

[57] ABSTRACT

A fishing lure is split horizontally to provide an upper body portion and a lower body portion, so that the upper body portion which carries the tail portion may flex freely without the rigidifying effect of the shank of the hook mounted in the lower body portion.

10 Claims, 11 Drawing Figures

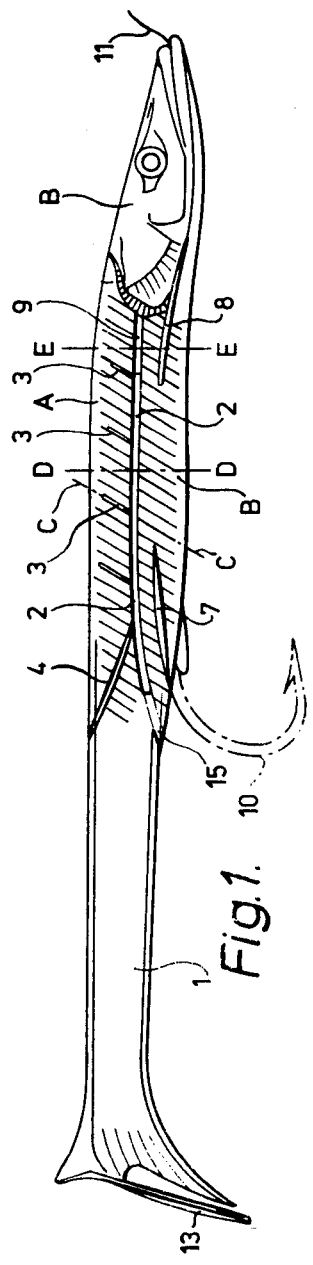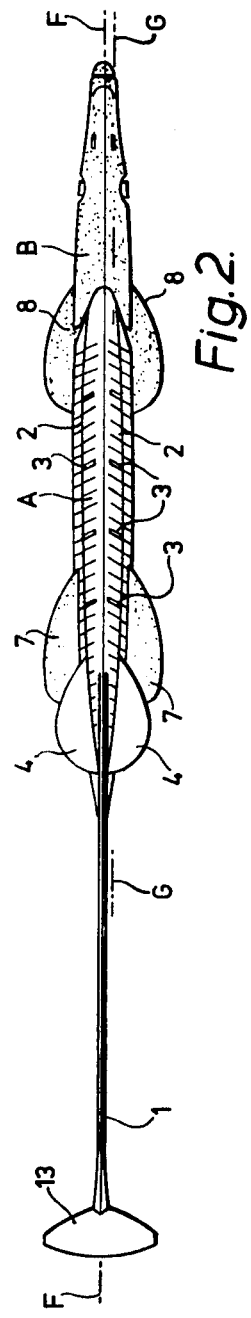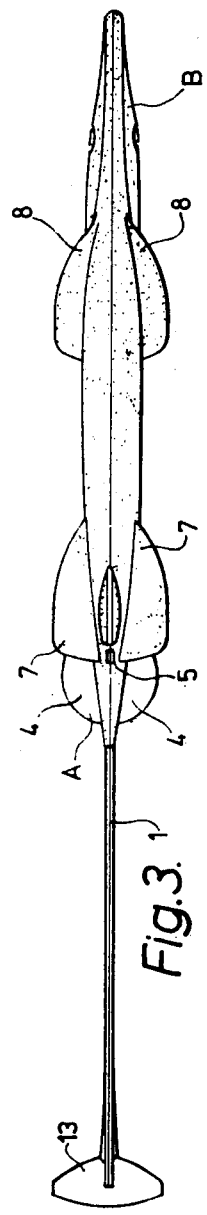

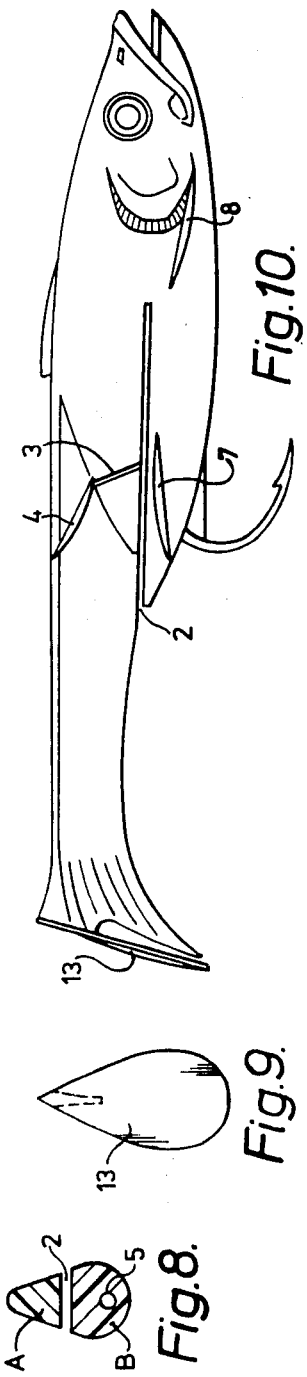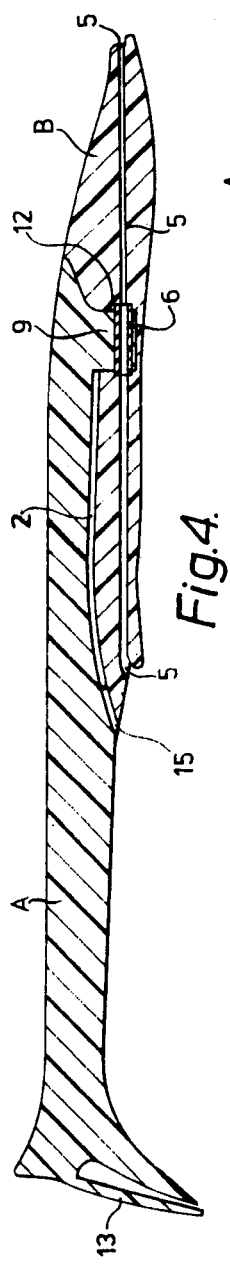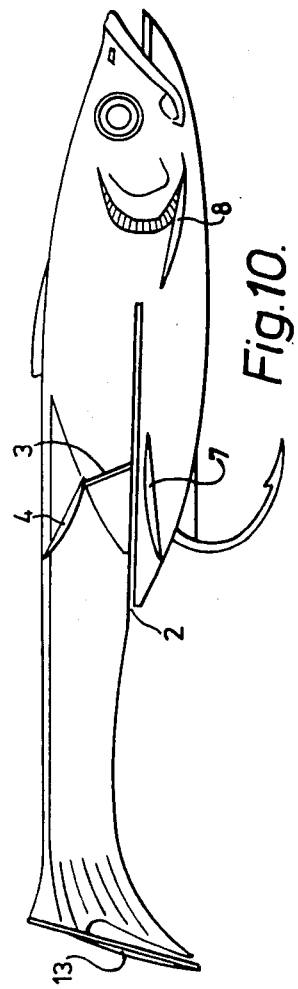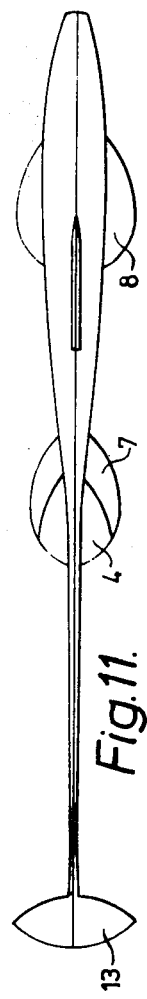

FISHING LURE

BACKGROUND OF THE INVENTION

This invention is concerned with a fishing lure.

Fishing lures have been made in which the fishing hook is supported in a facsimile fish body moulded in a flexible plastics material so that under water a life-like wriggling action is imparted to the facsimile fish. One problem with these lures is that the shank of the fishing hook which is passed through the fish body rigidifies the body and reduces the wriggling action. Also the flexible plastics material is extremely soft and easily damaged by the fish hook and the line attached to it.

SUMMARY OF THE INVENTION

According to the present invention there is provided a fishing lure, comprising a simulated fish body having a flexible tail portion, the fish body being divided into upper and lower body portions by a slot extending longitudinally through the body towards the head of the fish body, one of the body portions being apertured to receive a fishing hook, the other body portion supporting the flexible tail portion.

In practice, the flexible tail portion may be moulded integrally with said other body portion and so flexibility may occur freely along the body portion supporting the tail portion as far as its point of contact with the body portion which receives the hook.

The two body portions may be separate, one a flexible tail and body portion, and the other a relatively rigid body portion to receive the hook. The rigid material will better resist abrasion from the hook and attached fishing lines.

Alternatively, the body portion receiving the hook may be of a flexible material with a relatively rigid insert in the hook receiving aperture. Whether the lure is moulded in one or two pieces entirely from the flexible material, the rigidifying effect of the hook is confined to one body portion only.

When the lure is formed from two separate body portions, a plug and socket may be provided in the region of the head of the simulated fish body to lock the two body portions together.

The two body portions may be integral, in which case they are connected adjacent the head of the simulated fish body.

The fishing lure is preferably arranged so that the apertured hook receiving portion is the lower body portion and further slots may be provided extending from the longitudinal slot into one of the body portions to increase flexibility. A baffle plate may be positioned at the end of the tail which extends transversely of the body to provide life-like movement of the tail of the body.

To try to keep the two body portions together fins may be provided close to the longitudinal slot so that the water action tends to maintain the slot closed or alternatively, the end of the slot adjacent the tail may be closed by a bridge portion connecting the upper and lower body portions.

BRIEF DESCRIPTION OF THE DRAWINGS OF THE PREFERRED EMBODIMENTS

Two embodiments of the invention are illustrated in the accompanying drawings in which:

FIG. 1 is a side elevation of a two-part fishing lure according to the present invention, FIG. 2 is a plan view of the embodiment of FIG. 1, FIG. 3 is an under view of the embodiment of FIG. 1, FIGS. 4 and 5 are sectional elevations taken along the lines F—F and G—G respectively of FIG. 2, FIGS. 6, 7 and 8 are transverse cross-sections along the lines C—C, E—E and D—D respectively of FIG. 1, FIG. 9 is an end elevation of the tail end baffle plate of the embodiment of FIG. 1, FIG. 10 is a side elevation of a one piece fishing lure according to the present invention, and FIG. 11 is a plan view of the embodiment of FIG. 10.

DESCRIPTION OF THE PREFERRED EMBODIMENTS

Referring firstly to FIGS. 1 to 9 of the drawings, the fishing lure illustrated therein is a simulated sand-eel. The fish body has an upper body portion A which includes the tail portion 1 and a lower body portion B which has a through-bore 5 to receive the shank of a fishing hook 10 shown in broken lines in FIG. 1, and the line 11 attached to the eye of the hook. The upper and lower body portions A and B are separated by a longitudinal slot 2 which extends from behind the gills of the simulated fish body towards the head. The slot 2 allows the upper body portion A and tail portion 1 to flex freely, free from any rigidity imparted by the presence of the shank of a fishing hook 10 in the through-bore 5.

In the illustrated embodiment, the upper and lower body portions A and B are separate mouldings. The upper body portion A is moulded with a protruding plug 9 of pear-shaped cross-section as shown in FIG. 7, and the lower body portion B has a correspondingly shaped socket 12 which receives the plug 9 to lock the two body portions A and B together. The socket 12 is positioned just behind the head of the simulated fish which head is part of the lower body portion. This allows the upper body portion A to flex along its entire length rearwardly from its point of contact with the lower body portion.

The plug 9 crosses the both of the through-bore 5 in the lower body portion B and so it is provided with a corresponding through-bore to allow the passage of the line 11 to the eye of the fish hook. To protect the plug 9 against abrasion from the fish hook 10 or line 11, a small tube 6 of relatively harder material is inserted or moulded into the through-bore in the plug 9. It is intended that the eye of the hook should be situated on the tail side of the tube 6, and accordingly the line from the fish hook also serves as a locking member to retain the plug 9 in its socket 12 in the lower body portion B. The tube 6 is also of larger diameter than the through-bore 5, so that in the embodiment illustrated, where both body portions A and B are moulded from a soft flexible plastics material, the tube 6 is prevented from being pulled through the soft material of the lower body portion B when acting as a stop against which the eye of the hook bears. In a two part fish lure as shown in FIGS. 1 to 9, it is also possible to mould the upper body portion A in a flexible material and the lower body portion B in a relatively rigid material.

In the embodiment shown in the drawings, the flexibility of the upper body portion is increased by slots 3 which extend from the longitudinal slot 2 upwards along the outside surface of the upper body portion. These are cut along the natural rib line of the simulated sand-eel in sufficient numbers to give the required flexibility.

Attached to the tail end of the upper body portion A is a spoon-shaped baffle plate 13 which is normal to a vertical plane through the line F—F shown in FIG. 2. The plate 13 is given a very acute positive angle to the vertical and is attached for approximately one-third of its length of its to the top of the tail section 1 of the upper body portion A. When the fishing lure is drawn through the water, the action of the water on the spoon-shaped baffle 13 imparts a life-like wriggling action to the flexible upper body and tail portion A.

To prevent the upper body portion A lifting away from the body portion B under the action of water on the baffle plate 13 and thus opening the slot 2 in an unnatural manner, the upper body portion A is provided with fins 4 placed at a negative angle to the vertical and positioned near the open end of the slot 2. The action of the water on the fins 4 as the lure is drawn through the water tends to push the upper body portion A towards the lower body portion B and to close the slot 2. This inhibits vertical flexing of the upper body portion A, so that the natural sideways flexing action caused by the baffle 1 is favoured.

The upper and lower body portions A and B may also be joined adjacent the rear end of the slot 2 by a bridge portion spanning the slot 2. in this case, of course, the two body portions are not entirely separate but it has been found that the bridge portion prevents separation of the two body portions A and B also prevents the line 11 passing up the rear of the slot 2 in use and becoming entangled with the lure.

Further fins 7 and 8 may be added to the fish body for naturalistic effect, to stabilise the motion of the lure through the water, and to cause it to descend without the use of large weights on the line.

FIGS. 9 and 10 show a fishing lure according to the invention which is a simulated pilchard. This lure is moulded in one piece and the longitudinal slot 2 extending towards the head of the lure is provided moulding. As before, the slot 2 divides the fish body into an upper body portion which includes the flexible tail portion and a lower body portion which is apertured to receive a fish hook. Again, a spoon-shaped baffle 13 is positioned at the tail end of the upper body portion to impart a wriggling action to the upper body portion when the lure is drawn through the water, and the flexibility of the upper body portion is increased by a further slot 3, or slots as required, extending from the longitudinal slot 2 into the upper body portion. Fins 4, 7 and 8 have the same action as those described for the sand-eel embodiment.

I claim:
1. A fishing lure comprising:
   i. a simulated fish body having therein a generally horizontal slot extending longitudinally through the body towards the head of the fish and dividing the body into upper and lower body portions to allow the upper portion to flex horizontally relative to the lower portion, said lower body portion including a fishing hook receiving aperture
   ii. a flexible tail portion moulded integrally with the upper body portion,
   iii. a baffle plate positioned at the end of the tail and extending transversely of the body so that water action flexes the tail horizontally, and
   iv. means disposed close to the rear end of the longitudinal slot to keep the two body portions together.
2. A fishing lure, as claimed in claim 1, in which the means to keep the two body portions together comprises fins provided on the upper and lowr body portions close to the rear end of the horizontal slot and angled so that water action tends to keep the two body portions together.
3. A fishing lure, as claimed in claim 2, in which the two body portions are separate.
4. A fishing lure, as claimed in claim 3, in which said upper body portion is more flexible than the lower body portion.
5. A fishing lure, as claimed in claim 2, in which one of the body portions is formed with a protruding plug and the other with a correspondingly shaped socket, so that the two body portions are locked together.
6. A fishing lure, as claimed in claim 5, in which the plug and socket are provided in the region of the head of the simulated fish body, and in which the upper body portion is more flexible than the lower portion and is free to flex for its whole length rearwardly of the plug and socket.
7. A fishing lure, as claimed in claim 1, in which the two body portions are integrally connected adjacent the head of the simulated fish body.
8. A fishing lure, as claimed in claim 7, in which the means to keep the two body portions together comprises a bridge portion interconnecting the upper and lower body portions at the rear end of the slot.
9. A fishing lure, as claimed in claim 1, in which the lower body portion is of a flexible material with a more rigid insert in the hook-receiving aperture.
10. A fishing lure, as claimed in claim 1, in which further slots are provided extending from the longitudinal slot into one of the body portions.

* * * * *